(12) United States Patent
Berke et al.

(10) Patent No.: US 8,350,711 B2
(45) Date of Patent: Jan. 8, 2013

(54) SYSTEM AND METHOD FOR SAFE HANDLING OF INFORMATION RESOURCES BY MONITORING THERMAL PROPERTIES AND CONTROLLING OPERATION OF A COOLING FAN

(75) Inventors: Stuart Allen Berke, Austin, TX (US); Dominick Lovicott, Round Rock, TX (US); Hasnain Shabbir, Round Rock, TX (US); William Coxe, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 653 days.

(21) Appl. No.: 12/581,636

(22) Filed: Oct. 19, 2009

(65) Prior Publication Data

US 2011/0090087 A1 Apr. 21, 2011

(51) Int. Cl.
*G08B 21/00* (2006.01)
(52) U.S. Cl. ............ 340/584; 340/635; 353/57; 352/202
(58) Field of Classification Search .................. 340/584, 340/635; 348/748; 353/52, 57; 352/198, 352/202
See application file for complete search history.

(56) References Cited

U.S. PATENT DOCUMENTS 5,136,397 A * 8/1992 Miyashita ..................... 348/748
2006/0164602 A1 7/2006 Jayaram et al. ................. 353/57

* cited by examiner

*Primary Examiner* — Jeffery Hofsass
(74) *Attorney, Agent, or Firm* — Baker Botts L.L.P.

(57) ABSTRACT

Systems and methods for safe handling of information handling resources are provided. In some embodiments, a method is provided. The method may include detecting occurrence of a power down sequence and in response to detecting of the power down sequence, controlling operation of a cooling fan coupled to information handling resources based at least on a first criteria of a predetermined policy. The method may include receiving a signal from a sensor, the signal indicating a thermal property of a particular information handling resource coupled to the sensor. The method may include determining if the thermal property satisfies a second criteria of the predetermined policy, the second criteria comprising a safe temperature range for handling the particular information handling resource. If the thermal property meets the second criteria, the method may provide an alert via an indicator to a user indicating the particular information handling resource is safe for handling.

20 Claims, 1 Drawing Sheet

SYSTEM AND METHOD FOR SAFE HANDLING OF INFORMATION RESOURCES BY MONITORING THERMAL PROPERTIES AND CONTROLLING OPERATION OF A COOLING FAN

TECHNICAL FIELD

The present disclosure relates in general to servicing information handling system resources, and more particularly to safe handling of information handling resources after a power down sequence.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the capabilities of information handling systems have improved and processing demands have increased, the power requirements of information handling systems and their component information handling resources have increased. Accordingly, the amount of heat produced by such information handling resources has increased with some components operating at or close to the maximum temperature limits. The increased amount of heat poses potential risks such as injuries to a user, especially for users who service or swap out the components when the components are still hot to the touch.

Traditionally, upon a power off sequence (e.g., proper system shutdown, loss of power to the information handling system, malfunction of components, etc.), a required time delay between the power off sequence and service or handling of information handling resources is required. In some cases, the time delay considers a worst case scenario (e.g., the component temperature has to be below the rated maximum). However, the time delay is not always accurate as factors such as the temperature of the system as a whole, cooling fans configured to cool down the system upon a power off sequence, etc., may affect the required time delay. Thus, the required time delay may be too short and may cause injuries to system technicians who service the components in the information handling system. Alternatively, the time delay may be too long and may cause a prolonged downtime of the system and/or a delay in servicing the information handling resources.

SUMMARY

In accordance with the teachings of the present disclosure, the disadvantages and problems associated with cooling information handling resources have been substantially reduced or eliminated. In some embodiments, a system for safe handling of information handling resources is provided. The system may include a cooling fan, an information handling system, a controller, and an indicator. The information handling system may include a plurality of information handling resources coupled to the cooling fan and a sensor thermally coupled to at least one of the plurality of information handling resources. The controller, communicatively coupled to the sensor, may be configured for detecting occurrence of a power down sequence, and in response to detecting of the power down sequence, controlling the operation of the cooling fan based at least on a first criteria of a predetermined policy. The controller may also be configured for receiving a signal from the sensor, the signal indicating a thermal property of a particular information handling resource thermally coupled to the sensor. The controller may be configured to determine if the thermal property satisfies a second criteria of the predetermined policy, the second criteria including a safe temperature range for handling the particular information handling resource. If the thermal property meets the second criteria, the controller may provide an alert via the indicator to a user indicating that the particular information handling resource is safe for handling.

In other embodiments, an information handling system is provided. The information handling system may include one or more information handling resources and a controller coupled to the one or more information handling resources. The controller may be configured for detecting occurrence of a power down sequence of the information handling system. In response to detecting of the power down sequence, the controller may be configured for controlling operation of a cooling fan coupled to the information handling system based at least on a first criteria of a predetermined policy. The controller may also be configured to receive a signal from a sensor thermally coupled to at least one of the plurality of information handling resources, the signal indicating a thermal property of a particular information handling resource thermally coupled to the sensor. The controller may be configured to determine if the thermal property satisfies a second criteria of the predetermined policy, the second criteria comprising a safe temperature range for handling the particular information handling resource, and if the thermal property meets the second criteria, providing an alert via an indicator communicatively coupled to the controller to a user indicating the particular information handling resource is safe for handling.

In certain embodiments, a method for safe handling of information handling resources is provided. The method may include detecting occurrence of a power down sequence and in response to detecting of the power down sequence, controlling operation of a cooling fan coupled to the information handling resources based at least on a first criteria of a predetermined policy. The method may include receiving a signal from a sensor, the signal indicating a thermal property of a particular information handling resource thermally coupled to the sensor. The method may also include determining if the thermal property satisfies a second criteria of the predetermined policy, the second criteria comprising a safe temperature range for handling the particular information handling resource. If the thermal property meets the second criteria, the method may provide an alert via an indicator to a user indicating the particular information handling resource is safe for handling.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
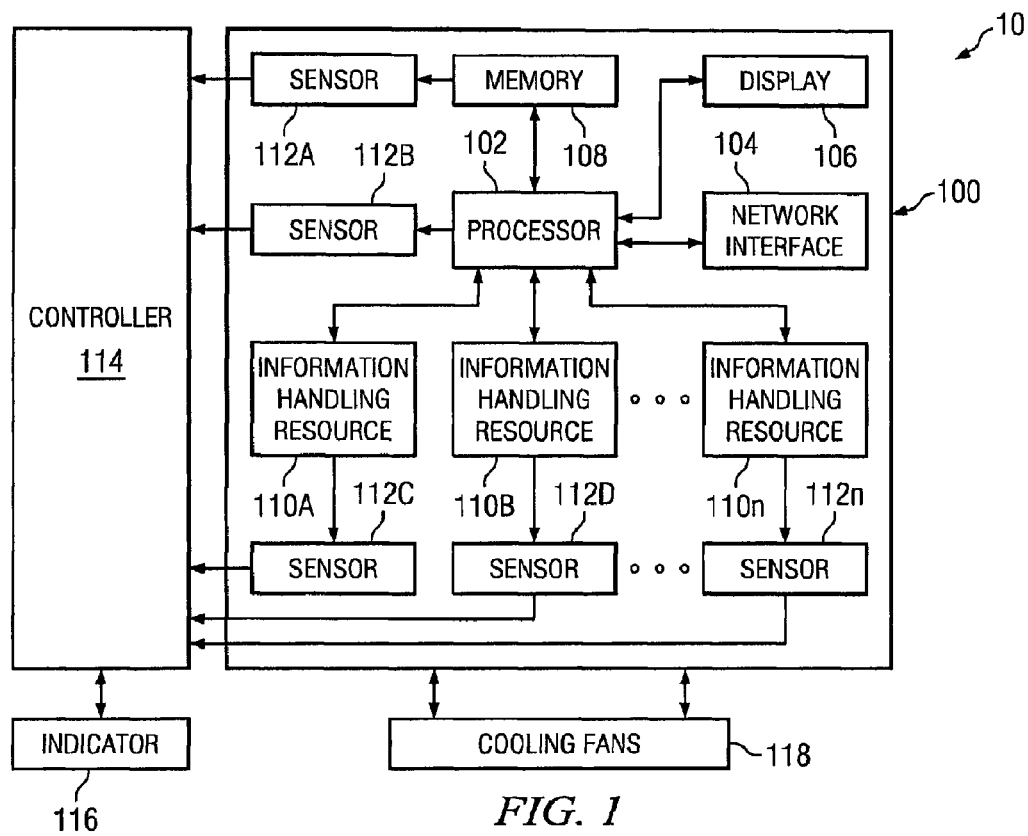
FIG. 1 illustrates a system for safe handling of information handling resources of an information handling system, in accordance with certain embodiments of the present disclosure.
Figure 2:
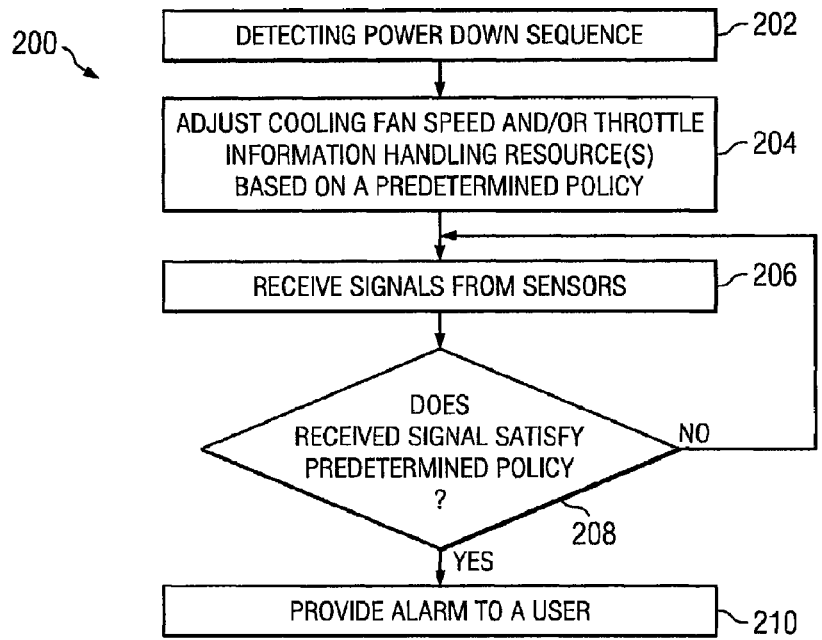
FIG. 2 a flow chart of an example method for safe handling of information handling resources, in accordance with certain embodiments of the present disclosure.

Preferred embodiments and their advantages are best understood by reference to FIGS. 1-2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

FIG. 1 illustrates an example system 10 for safe handling of information handling resources of an information handling system 100, in accordance with certain embodiments of the present disclosure. As shown in FIG. 1, system 10 may include information handling system 100, controller 114, indicator 116, and cooling fan(s) 118.

In certain embodiments, information handling system 100 may include a computer chassis or enclosure (e.g., a server chassis holding one or more server blades, a monolithic server). In other embodiments, information handling system 100 may include a storage enclosure, storage systems, switches, etc. In yet other embodiments, information handling system 100 may be a personal computer or workstation (e.g., a desktop computer or a portable computer).

Information handling system 100 may include processor 102, network interface 104, display, 106, memory 108, one or more information handling resources 110, and one or more sensors 112. Processor 102 may include any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in, for example, one or more memories 108, and/or another component of information handling system 100 and may output results, graphical user interfaces (GUIs), websites, and the like via display 106 or over network interface 104.

Network interface 104 may be coupled to processor 102 and may be any suitable system, apparatus, or device operable to serve as an interface between information handling system 100 and a network. Network interface 104 may enable information handling system 100 to communicate over a wired and/or a wireless network using any suitable transmission protocol and/or standard, including without limitation all transmission protocols and/or standards known in the art. Network interface 104 and its various components may be implemented using hardware, software, or any combination thereof.

Display 106 may be coupled to processor 102 and may include any display device suitable for creating graphic images and/or alphanumeric characters recognizable to a user, and may include, for example, a liquid crystal display (LCD), plasma display, light-emitting diode display, or a cathode ray tube (CRT).

Memory 108 may be coupled to processor 102 and may include any system, device, or apparatus operable to retain program instructions or data for a period of time. Memory 108 may include random access memory (RAM), electrically erasable programmable read-only memory (EEPROM), a PCMCIA card, flash memory, or any suitable selection and/or array of volatile or non-volatile memory that retains data after power to information handling system 100 is turned off.

Information handling resources 110 may broadly refer to any component system, device, or apparatus of information handling system 100, including without limitation, processors (e.g., processor 102), busses, memories (e.g., memory 108, fully buffered DIMMs, DDR3 RDIMMs, and/or UDIMMS), chipset components, audio cards, video cards, graphic cards, ambient inlet air ports, input-output devices and/or interfaces, storage resources (e.g., hard drives, DVDs CDs, USB drives, and/or any other integrated or external storage resources coupled to information handling system 100), voltage regulators, network interfaces, motherboards, electro-mechanical devices, displays, power supplies, and/or other components depending on the configuration of system 10. It is noted that the term "components" as used in this disclosure may refer to any combination of processor 102, memory 108, and/or information handling resource(s) 110 of information handling system 100.

Sensors 112 may be configured to thermally monitor components of information handling system 100 (e.g., information handling resources 110, memory 108, and/or processor 102). In some embodiments, a specific sensor 112 may be thermally coupled to a component of information handling system 100 and may monitor the temperature of the component. Sensor 112 may also be used to monitor the temperature of multiple components that are thermally coupled to sensor 112. In other embodiments, one or more sensors 112 may be used to correlate the temperature of components that may or may not be directly coupled to a sensor 112. For example, controller 114 may determine an empirical correlation based on one or more sensors 112 to determine the temperature of components not directly coupled to a sensor 112.

Controller 114 may be coupled to information handling system 100 using any suitable protocol and/or standard including, for example, the Intelligent Platform Management Interface (IPMI) architecture. In some embodiments, controller 114 may include or be an integral part of a baseboard management controller (BMC) and may be configured to determine a power down sequence for system 10, and in particular information handling system 100. Controller 114 may also be configured to receive signals from sensors 112 coupled to components of information handling system 100 (e.g., processor 102, memory 108, and/or information handling resources 110). Based at least on the received signal, controller 114 may communicate alerts via, for example, indicator 116 to a user (e.g., servicing technician) if any of the parameters associated with sensors 112 vary from preset limits or thresholds. For example, in some embodiments, sensors 112 may be configured to thermally monitor components directly or indirectly coupled to sensors 112 of information handling system 100. If a respective sensor 112 indicates that the component coupled to the respective sensor 112 is safe to handle, e.g., the temperature of the component is safe for servicing, controller 114 may provide a notification through indicator 116, such as provide an audio and/or visual (e.g., LED alerts) alarm, output a message on a display (e.g., display 106). Indicator 116 may be coupled to an auxiliary power source (e.g., battery, capacitors, etc.) configured to power at least indicator 116 after a power off sequence to system 10.

In some embodiments, controller 114 may be configured based on a user-provided policy, system configuration policy, or other predetermined policy that may allow custom power tailoring, acoustics (e.g., noise levels) considerations, and/or cool down time requirement before the servicing of information handling resources 110 of information handling system 100. Controller 114 may control cooling fans 118 coupled to information handling system 100, or throttle information handling resources 110 based on the predetermined policy at the onset of the power off sequence. Cooling fans 118 may be any mechanical or electro-mechanical fan used for cooling purposes. In certain embodiments, cooling fan(s) 118 may draw cool air from the outside, expel warm air from the components (e.g., information handling resource(s) 110, memory 108, and/or processor 102) of information handling system 100, and/or move air across a heat sink to cool one or more particular components of information handling system 100.

For example, if the predetermined policy indicates rapid cool down with little or no acoustic considerations (e.g., noise level does not matter) to reduce or minimize the downtime of system 10, controller 110 may operate cooling fans 118 at maximum speed and/or power to quickly cool down the information handling resources 110 of information handling system 100. While cooling fans 118 operate, controller 114 may receive thermal information from one or more sensors 112 indicating a temperature of the associated information handling resource 110. If the thermal information indicates that the associated information handling resource 110 is safe to handle (e.g., safe to service, safe to swap out, etc.), controller 114 may provide an audio and/or visual alert through indicator 116 to a user.

In some embodiments, controller 114 may receive signals from sensors 112 thermally coupled to information handling resources 110 that are hot-swappable or removable devices such as, for example, blade module(s), I/O card(s) and/or module(s), processing unit(s), memory card(s) or module(s), hard disk drive(s) (HDD), and/or redundant power supply unit(s). If a sensor 112 is thermally coupled to the hot-swappable or removable device indicates that the temperature of the device is safe for removal, controller 114 may provide an alert through indicator 116, such as an alarm, LCD messages displayed on a display (e.g., display 106), LEDs, and/or other visual and/or audible alerts to a user.

In some embodiments, controller 114 may be configured to prevent servicing and/or handling of information handling resources 110 until the resources have properly cooled down. An electro-mechanical cover may be placed over or around some or all components of information handling system 100. During the cooling of the information handling resources 110 using cooling fans 118, controller 114 may keep electro-mechanical cover locked. Signals indicating thermal properties of the covered information handling resources 110 may be sent from sensors 112 to controller 114. When the information handling resources 110 have cooled down or when a predetermined policy has been met, controller 114 may be configured to first indicate an audio and/or visual alert to a user via indicator 116. Controller 114 may also be configured to "unlock" the cover allowing the user safe access to the information handling resources 110.

In operation, upon detection of a power off sequence by controller 114, either initiated by a user or during a power interruption or power failure to system 10, controller 114 may control the operating of cooling fans, e.g., adjusting the speed of cooling fans 118 or throttling information handling resources 110. In some embodiments, controller 114 may adjust the speed of cooling fans 118 based on a predetermined policy such as, for example, a user-provided policy or a system configuration policy that may provide thresholds that should be met prior to servicing or handling of information handling resources 110. For example, the predetermined policy may include a fan speed for cooling fans 118 based on acoustic levels (e.g., minimizing noise levels during the operation of cooling fans 118), power requirements (e.g., minimizing cooling fan speeds to reduce and/or minimize power consumption), desired thermal properties for each information handling resource 110 (e.g., a safe temperature for handling and/or servicing information handling resources 110), etc.

As cooling fans 118 operate, sensors 112 may send signals to controller 114 indicating the temperature of one or more information handling resources 110. In some embodiments, a sensor 112 may send signals relating to the thermal properties of a corresponding information handling resource 110 directly coupled to the sensor 112. In the same or alternative embodiments, controller 114 may determine the temperature of a component not directly coupled to any sensors based on signals received from multiple sensors 112 surrounding the component. If the received signals from sensor(s) 112 indicate that one or more information handling resources 110 are safe for handling, controller 114 may provide an audible and/or visible alert to a user via indicator 116.

Controller 114 may also be configured to provide a report via, for example, display 106 or network interface 104. The report may summarize the events during and after a power off sequence is detected. In some embodiments, the report may include, without limitation, the type of power off sequence (e.g., user initiated or power failure or interruption), the temperatures of one or more information handling resources 110 received from sensors 112, if the temperatures satisfy a predetermined policy, if one or more information handling resources 110 were serviced or handled prior to an alert being issued by controller 114, the fan speed of cooling fans 118, the power consumption of cooling fans 118, the noise level of cooling fans 118, the ambient temperature, the temperature of system 10, and/or other system configurations.

FIG. 2 illustrates a flow chart of an example method 200 for safe handling of information handling resources, in accordance with certain embodiments of the present disclosure. At step 202, controller 114 may detect an occurrence of a power off sequence. The power off sequence may be user initiated (e.g., software powering down sequence or hardware power down such as power button reset) or may be a power interruption and/or a power failure to system 10 or a subcomponent of system 10.

At step 204, controller 114 may dynamically adjust the fan speed of cooling fans 118 or throttle information handling resources 110 to cool down the components of system 10. In some embodiments, cooling fans 118 may be adjusted based on a predetermined policy such as, for example, a user-provided policy or a system configuration policy. In each of the predetermined policies, a variety of different factors may be considered. For example, the predetermined policy may determine the operation of cooling fans 118 (e.g., the fan speed, power consumption of cooling fans 118, the noise level of cooling fans 118, and/or other fan operation factors).

In some embodiments, the predetermined policies may also define a desired time period in which system 10 is offline or powered down, thus affecting the operation of cooling fans 118. For example, in a routine system maintenance and/or for replacing devices, the predetermined policies may determine that the cooling fan speeds should operate at maximum capacity (e.g., regardless of noise or acoustic consideration and/or power consumption) to properly and promptly cool down the components of information handling system 100 such that the service maintenance and/or replacing of components can be performed quickly and system 10 may be restored sooner.

The predetermined policies may also define a suitable handling temperature for some or all of the components of information handling system 100. The suitable handling temperature may be based on, for example, the type of components (e.g., DIMMS, chipsets, power supply units, hard drives, I/O cards or modules, etc.,) duration and type of handling (e.g., incidental or long-term handling including swapping out components), the type of materials touched (e.g., metal, plastic, glass, etc.), government and/or manufacturer standards and labels, the ambient temperature, the temperature of system 10, the temperature of surrounding components, and other factors.

At step 206, as cooling fans 118 continue to cool down information handling resources 110 of information handling system 100, sensors 112 may send signals to controller 114. The signals may indicate the temperature of the information handling resources 110 coupled directly and/or indirectly to sensors 112.

At step 208, controller 214 may determine if the signals received from sensors 112 satisfy the predetermined policies and/or if the signals indicate if one or more information handling resources 110 are safe for handling. For example, controller 114 may determine whether the signal indicating the temperature of a particular information handling resource 110 is safe for servicing and/or handling. If the temperature is not safe for handing, method 200 may proceed to step 206, where controller 114 awaits updated signals sent from sensors 112.

If the temperature of the particular information handling resource 110 is safe for handling, method 200 may proceed to step 210 where controller 114 may provide an audible and/or visual alert to a user via indicator 116.

In some embodiments, system 10 and controller 114 may prepare system 10 for handling and/or servicing of the information handling resource 100. For example, system 10 and/or controller 114 may power off power rails to system 10. In the same or alternative embodiments, controller 114 may generate a report of the various factors of system 10 before, during, and after the detection of a power off sequence. For example, controller 114 may output a report via display 106 and/or over network interface 104 listing, for example, the type of power off sequence, the temperature of one or more components of information handling system 100, the fan speed and/or power consumption of cooling fans 118, if an alert was provided via indicator 116, etc.

Using the methods and systems disclosed herein, problems associated with conventional approaches to safe handling of information handling resources of an information handling system may be improved, reduced, or eliminated. For example, the methods and systems disclosed herein provide for controlling the cooling effects on the information handling resources, monitoring the thermal properties of the information handling resources, and alerting a user when one or more of the information handling resources are available for servicing and/or handling. In addition, certain embodiment provide user-provided policies and/or system configuration policies that establish servicing and/or handling guidelines that may be based on government guidelines, component guidelines, manufacturer guidelines, system guidelines, and/or other guidelines, warnings, or labels.

Although the present disclosure has been described in detail, it should be understood that various changes, substitutions, and alterations can be made hereto without departing from the spirit and the scope of the disclosure as defined by the appended claims.

What is claimed is:

1. A system for safe handling of information handling resources, comprising:
   a cooling fan;
   an information handling system comprising:
      a plurality of information handling resources coupled to the cooling fan; and
      a sensor thermally coupled to at least one of the plurality of information handling resources; and
   a controller communicatively coupled to the sensor, wherein the controller is configured for:
      detecting occurrence of a power down sequence;
      in response to detecting of the power down sequence, controlling operation of the cooling fan based at least on a first criteria of a predetermined policy;
      receiving a signal from the sensor, the signal indicating a thermal property of a particular information handling resource thermally coupled to the sensor;
      determining if the thermal property satisfies a second criteria of the predetermined policy, the second criteria comprising a safe temperature range for handling the particular information handling resource; and
      if the thermal property meets the second criteria, providing an alert via an indicator to a user indicating that the particular information handling resource is safe for handling.

2. The system according to claim 1, wherein the controller is further configured to determine thermal properties of other information handling resources of the plurality of information handling resources based at least on the received signal from the sensor.

3. The system according to claim 1, wherein the first criteria of the predetermined policy comprises operational factors of the cooling fan, the operational factors including at least one of a fan speed, noise level, and power consumption of the cooling fan.

4. The system according to claim 1, wherein the predetermine policy comprises a user-provided policy or a system configuration policy.

5. The system according to claim 1, wherein the indicator comprises at least one of an audible alert and visual alert.

6. The system according to claim 1, wherein the controller is further configured for reporting configuration parameters of the system during and after the step of detecting occurrence of the power down sequence.

7. The system according to claim 1, further comprising an electro-mechanical cover covering at least a portion of the information handling system.

8. The system according to claim 7, wherein the controller is further configured to lock the electro-mechanical cover at least until the thermal property satisfies the second criteria of the predetermined policy.

9. An information handling system, comprising:
one or more information handling resources; and
a controller communicatively coupled to the one or more information handling resources and configured for:
 detecting occurrence of a power down sequence of the information handling system;
 in response to detecting of the power down sequence, controlling operation of a cooling fan coupled to the information handling system based at least on a first criteria of a predetermined policy;
 receiving a signal from a sensor thermally coupled to at least one of the plurality of information handling resources, the signal indicating a thermal property of a particular information handling resource thermally coupled to the sensor;
 determining if the thermal property satisfies a second criteria of the predetermined policy, the second criteria comprising a safe temperature range for handling the particular information handling resource; and
 if the thermal property meets the second criteria, providing an alert via an indicator communicatively coupled to the controller to a user indicating the particular information handling resource is safe for handling.

10. The information handling system of claim 9, wherein the one or more information handling resources comprise at least one of a processor and a memory device.

11. The controller according to claim 9, wherein the controller comprises a baseboard management controller.

12. The controller according to claim 9, wherein controlling operation of the cooling fan comprises at least controlling the fan speed of the cooling fan.

13. The controller according to claim 9, wherein the first criteria of the predetermined policy comprises operational factors of the cooling fan, the operational factors including at least one of a fan speed, noise level, and power consumption of the cooling fan.

14. The controller according to claim 9, wherein the controller is further configured to lock an electro-mechanical cover covering at least a portion of the information handling system at least until the thermal property satisfies the second criteria of the predetermined policy.

15. The controller according to claim 9, wherein the controller is further configured for reporting configuration of the system during and after the step of detecting occurrence of the power down sequence.

16. A method for safe handling of information handling resources, the method comprising:
 detecting occurrence of a power down sequence;
 in response to detecting of the power down sequence, controlling operation of a cooling fan coupled to the information handling resources based at least on a first criteria of a predetermined policy;
 receiving a signal from the sensor, the signal indicating a thermal property of a particular information handling resource thermally coupled to the sensor;
 determining if the thermal property satisfies a second criteria of the predetermined policy, the second criteria comprising a safe temperature range for handling the particular information handling resource; and
 if the thermal property meets the second criteria, providing an alert via an indicator to a user indicating the particular information handling resource is safe for handling.

17. The method according to claim 16, wherein controlling operation of the cooling fan comprises controlling at least one of the fan speed and the power consumption of the cooling fan.

18. The method according to claim 16, wherein the first criteria of the predetermined policy comprises operational factors of the cooling fan, the operational factors including at least one of a fan speed, noise level, and power consumption of the cooling fan.

19. The method according to claim 16, wherein the predetermine policy comprises a user-provided policy or a system configuration policy.

20. The method according to claim 16, wherein the indicator comprises at least one of an audible alert and visual alert.

* * * * *